United States Patent
Huke et al.

(10) Patent No.: US 12,361,797 B2
(45) Date of Patent: *Jul. 15, 2025

(54) METHOD FOR REPLAYING A BET AND SHARING

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US); Harrison Grant, Anaheim, CA (US); Michael Baker, Georgie, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,553

(22) Filed: Sep. 8, 2023

(65) Prior Publication Data

US 2023/0419790 A1    Dec. 28, 2023

Related U.S. Application Data

(63) Continuation of application No. 17/473,065, filed on Sep. 13, 2021, now Pat. No. 11,790,733, which is a continuation of application No. 17/115,000, filed on Dec. 8, 2020, now Pat. No. 11,145,166.

(60) Provisional application No. 63/093,430, filed on Oct. 19, 2020.

(51) Int. Cl.
*G07F 17/32* (2006.01)
*A63F 13/65* (2014.01)
*G06Q 50/00* (2012.01)
*G06Q 50/34* (2012.01)

(52) U.S. Cl.
CPC .......... *G07F 17/3288* (2013.01); *A63F 13/65* (2014.09); *G06Q 50/01* (2013.01); *G06Q 50/34* (2013.01); *G07F 17/3223* (2013.01); *G07F 17/3272* (2013.01); *G07F 17/3276* (2013.01); *G07F 17/3279* (2013.01)

(58) Field of Classification Search
None
See application file for complete search history.

(56) References Cited

U.S. PATENT DOCUMENTS

| | | | |
|---|---|---|---|
| 10,437,658 B2 | 10/2019 | Alonso et al. | |
| 2009/0131177 A1* | 5/2009 | Pearce | A63F 13/30 463/43 |
| 2012/0115554 A1* | 5/2012 | Cairns | G07F 17/3288 463/25 |
| 2013/0165210 A1 | 6/2013 | Nev et al. | |

(Continued)

OTHER PUBLICATIONS

International Search Report and Written Opinion issued on Jan. 27, 2022 in corresponding International Patent Application No. PCT/US2021/055546; 17 pages.

*Primary Examiner* — Jason T Yen
(74) *Attorney, Agent, or Firm* — Maier & Maier, PLLC

(57) ABSTRACT

A system for modifying video of a live sporting event to include details of a micro market wager. A wagering platform that offers wagers on micro markets inside of a sporting event can produce personalized content for each user around highlights of their wagering experience. The modified video can be shared with the user's contacts and the user can receive shared modified videos from their contacts.

10 Claims, 5 Drawing Sheets

(56) References Cited

U.S. PATENT DOCUMENTS

| | | | |
|---|---|---|---|
| 2013/0211561 A1* | 8/2013 | Rabinovitz | G07F 17/3288 700/91 |
| 2014/0032435 A1* | 1/2014 | Desai | G06Q 50/01 705/321 |
| 2015/0379808 A1* | 12/2015 | Rosenblatt | G07F 17/3227 463/20 |
| 2017/0017657 A1* | 1/2017 | English | G07F 17/3211 |
| 2017/0358173 A1* | 12/2017 | Mccafferty | G07F 17/3239 |
| 2018/0075696 A1* | 3/2018 | Abouchar | G07F 17/3255 |
| 2019/0051116 A1* | 2/2019 | Joao | G07F 17/3225 |
| 2020/0126363 A1* | 4/2020 | Trepp | G07F 17/3258 |
| 2020/0234543 A1* | 7/2020 | Schwartz | G07F 17/3279 |
| 2020/0250918 A1 | 8/2020 | Joao | |
| 2020/0342717 A1* | 10/2020 | Nelson | G07F 17/3288 |
| 2022/0351569 A1* | 11/2022 | Ikeda | G07F 17/323 |

* cited by examiner

| User ID | User Full | Conact 1 | Contact 1 Full | Conact 2 | Contact 2 Full | ... | Conact N | Contact N Full |
|---|---|---|---|---|---|---|---|---|
| bpatterson | Bob Patterson | jpatterson | James Patterson | kpatterson | Kathren Patterson | ... | football_guy_1979 | Joe Smith |
| mordesnumero1 | Sergio Espada | dougdimmadome | Doug Bernikie | Jim_and_juice | Jim Nguyen | ... | - | - |
| football_guy_1979 | Joe Smith | Jim_and_juice | Jim Nguyen | soccerfan1510 | Julien Massakov | ... | bpatterson | Bob Patterson |
| - | - | - | - | - | - | ... | - | - |

Fig. 2

| User ID | Wager | W/L | Live Event ID | Play ID |
|---|---|---|---|---|
| bpatterson | Run | W | baseball_08112020 | 12 |
| bpatterson | Pass | L | baseball_08112020 | 13 |
| bpatterson | Pass | W | baseball_08112020 | 14 |
| - | - | - | - | - |

Fig. 3

| Live Event ID | Play | Recording File |
|---|---|---|
| baseball_08112020 | 23 | baseball_08112020_23.MP4 |
| football_10122020 | 9 | football_10122020_09.MP4 |
| hockey_11292020 | 17 | hockey_11292020_17.MOV |
| - | - | - |

Fig. 4

| User ID | Clip | Wager | W/L | Live Event ID | Play ID |
|---|---|---|---|---|---|
| bpatterson | 1.MP4 | Run | W | 8112020 | 12 |
| bpatterson | 2.MP4 | Pass | L | 8112020 | 13 |
| bpatterson | 3.MP4 | Pass | W | 8112020 | 14 |
| - | - | - | - | - | - |
| - | - | - | - | - | - |

METHOD FOR REPLAYING A BET AND SHARING

FIELD

The embodiments are generally related to play by play wagering on live sporting events focused on individual players.

BACKGROUND

The prevalence of social media has made the capturing of significant or exciting events important to many people. The spread of sports wagering that has accompanied the Supreme Court's ruling on the Professional and Amateur Sports Protection Act is going to create a number of opportunities for exciting wagering experiences. To capture these experiences users currently need to capture the experience in real time, taking time and focus away from both their wagering experience and their experience of the live sporting event they are wagering on. The user may want to capture information from the live event, the wagering platform and their own experience, in order to memorialize the experience. To capture all this data efficiently would require significant resources from the user.

Current sports betting platforms provide numerous different ways to wager on entire sporting events, or individual aspects or portions of those events. Betting on portions of events, or micro-betting, has become more accessible due to advancements in technology. However, as with the emergence of any new market that branches off from an existing market, micro-betting comes with new opportunities and problems that betting on an entire sporting event did not have. One problem is that it may be difficult to communicate with others which portion of an event a person successfully wagered on. Especially when there are multiple portions of the event that can be described the same way, for example in football a conversion on 3rd and 10 during the first quarter may describe more than one play. Further, a bettor may have a net gain over the course of an event but may not remember exactly what they wagered on each individual portion of the event that lead to that net gain.

SUMMARY

A method, system and apparatus for real time wagering, including replaying a wager or bet and sharing data across a wagering network. One embodiment can include a method of sharing a wager placed on a single play inside of a live sporting event on and video of the play on a wagering network via a social network, including receiving data from a live sporting event upon which wagers can be placed on single plays inside of that live event, and allowing at least one user to place a wager on a single play in the live event, and using video of the play upon which at least one user has placed a wager, where the user shares the wager and video with at least one other person on a social network.

Another embodiment includes a method of displaying wagers placed on a play by play wagering system, including executing on a processor the steps of displaying a wagering platform; displaying one or more wagers for wagering on a single play of a live sporting event; and displaying a notification that a video of a placed wager from the one or more displayed wagers has been shared.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2 illustrates a user database, according to an embodiment.

FIG. 3 illustrates an event wager database, according to an embodiment.

FIG. 4 illustrates a recording database, according to an embodiment.

DETAILED DESCRIPTION

Figure 1:
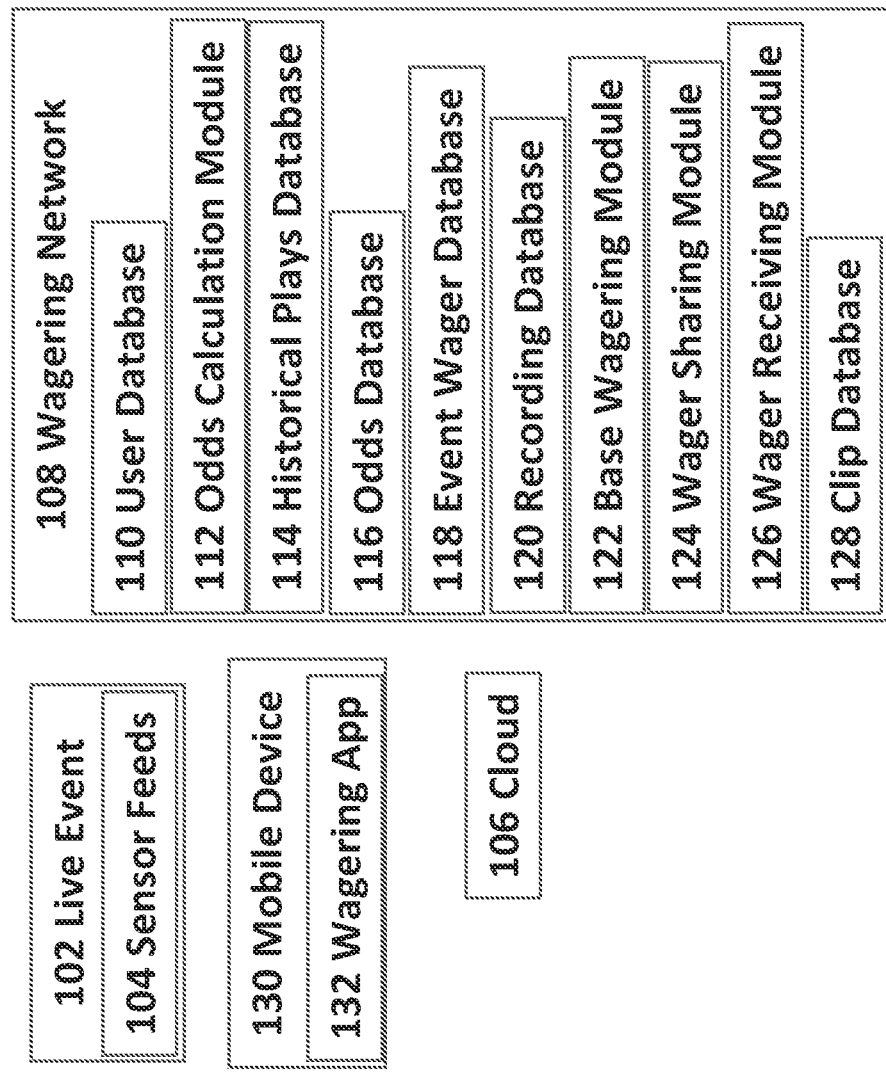
FIG. 1 illustrates a player focused wagering system, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog+4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for a wager replaying and sharing system. This system may include a live event 102, for example a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half time bets. Additionally, the sportsbook can offer futures bets on live events 102 in the future. Sportsbooks need to offer payment processing services in order to cash out customers. This can be done at kiosks at the live event or at another location.

Further, embodiments may include a plurality of sensors 104 that may be used such as motion sensors, temperature sensors, humidity sensors, cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball.

Further, embodiments may include a cloud 106 or communication network that may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet and relies on sharing of resources to achieve coherence and economies of scale, like a public utility, while third-party clouds allow organizations to focus on their core businesses instead of expending resources on computer infrastructure and maintenance. The cloud 106 may be communicatively coupled to wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in other exemplary embodiments, the cloud may not receive data gathered from sensors 104 and may, instead, receive data from an alternative data feed, such as Sports Radar®. This data may be compiled substantially immediately following the completion of any play and the data from this feed may be compared with a variety of team data and league data based on a variety of elements, including down, possession, score, time, team, and so forth, as described in various exemplary embodiments herein.

Further, embodiments may include a wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other exemplary embodiments, wagering network 108 may not receive data gathered from sensors 104 and may, instead, receive data from an alternative data feed, such as Sports Radar®. This data may be provided substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may include a user database 110 which contains data relevant to all users of the system, which may include, a user ID of the user, a device identifier for their mobile device 130, a list of the players indicated as favorites by the user through the favorites module 120, and could also include wagering history on the user, contacts which are used by the wager sharing module to send wager invitations to, and other relevant user data.

Further, embodiments may include an odds calculation module 112 which utilizes historical play data to calculate odds for in-play wagers.

Further, embodiments may include a historical plays database 114, that contains play data for the type of sport being played in live event 102. For example, in American football for optimal odds calculation, the historical play data should include meta data about the historical plays, such as time, location, weather, previous plays, opponent, physiological data, etc.

Further, embodiments may include an odds database 116 that contains the odds calculated by the odds calculation module to display the odds the user's mobile device 130 and to take bets from the user through the mobile device wagering app 132.

Further, embodiments may include an event wager database 118 which stores users wagers during a live event 102 including wagers placed on specific plays and including the results of the wager.

Further, embodiments may include a recording database 120 which stores recordings of a live event 102 as individual plays occurring during the live event 102.

Further, embodiments may include a base wagering module 122 that allows the user to log into the wagering network 108, view the selectable wagers, and make a wager, the base wagering module 122 creates timestamps for the beginning and end of a play which are stored in the event wager database 118, if the user wins the wager the base wagering module 122 initiates the wager sharing module 124, then initiates the wager receiving module 126.

Further, embodiments may include a wager sharing module 124 which allows users to share successful wagers with their contacts in the user database 110.

Further, embodiments may include a wager receiving module 126 which allows users to receive successful wagers that have been shared with them by other users.

Further, embodiments may include a clip database 128 which stores the recordings of individual plays with the wagering information overlayed, in some embodiments this database may be on the user's mobile device 130.

Further, embodiments may include a mobile device 130 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allows for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 130 could be an optional component and would be utilized in a situation in which a paired wearable device is utilizing the mobile device 130 as additional memory or computing power or connection to the internet.

Further, embodiments may include a wagering app 132, which is a program that enables the user to place bets on individual plays in the live event 102, and display the audio and video from the live event 102, along with the available wagers on the mobile device 130. The wagering app 132 allows the user to interact with the wagering network 108 in order to place bets and provide payment/receive funds based on wager outcomes.

FIG. 2 illustrates the user database 110. The user database 110 contains data relevant to all users of the system and contains at least a user ID for each user and the user IDs of that user's contacts, for example user Bob Patterson has the user ID bpatterson, in his contacts he has jpatterson, the user ID for his son James Patterson, kpatterson, the user ID for his wife Kathren Patterson, football_guy_1979, the user ID for his friend Joe Smith, etc., in some embodiments the user database 110 may contain a user ID of the user, a device identifier for their mobile device 128, a list of the players indicated as favorites by the user through the favorites module 120, and could also include wagering history on the user.

FIG. 3 illustrates the event wager database 118. The event wager database 118 contains users wagers during a live event 102 including time stamps for wagers placed on specific plays and including the results of the wager. The database contains a user ID, for example, "bpatterson", the selected wager option, for example, run, whether the wager was won or lost, a live event ID, for example, "baseball_08112020", a play ID, for example, "12", in some embodiments the database may contain additional data such as wager amount, wager odds, etc. 4

FIG. 4 illustrates the recording database 120. The recording database 120 contains recordings of a live event 102 either in its entirety or as individual plays occurring during the live event 102. The database contains a live event ID, for example, a baseball game recorded on 8/11/2020 could have a live event ID such as "baseball_08112020", a play ID, for example, the 23rd play of the game, or at least the 23rd play on which a wager may be placed, would have a play ID of "23", and a recording file, for example, the recording file for the 23rd play of the baseball game on 8/11/2020 may be titled "baseball_08112020_23.MP4".5

Figure 5:
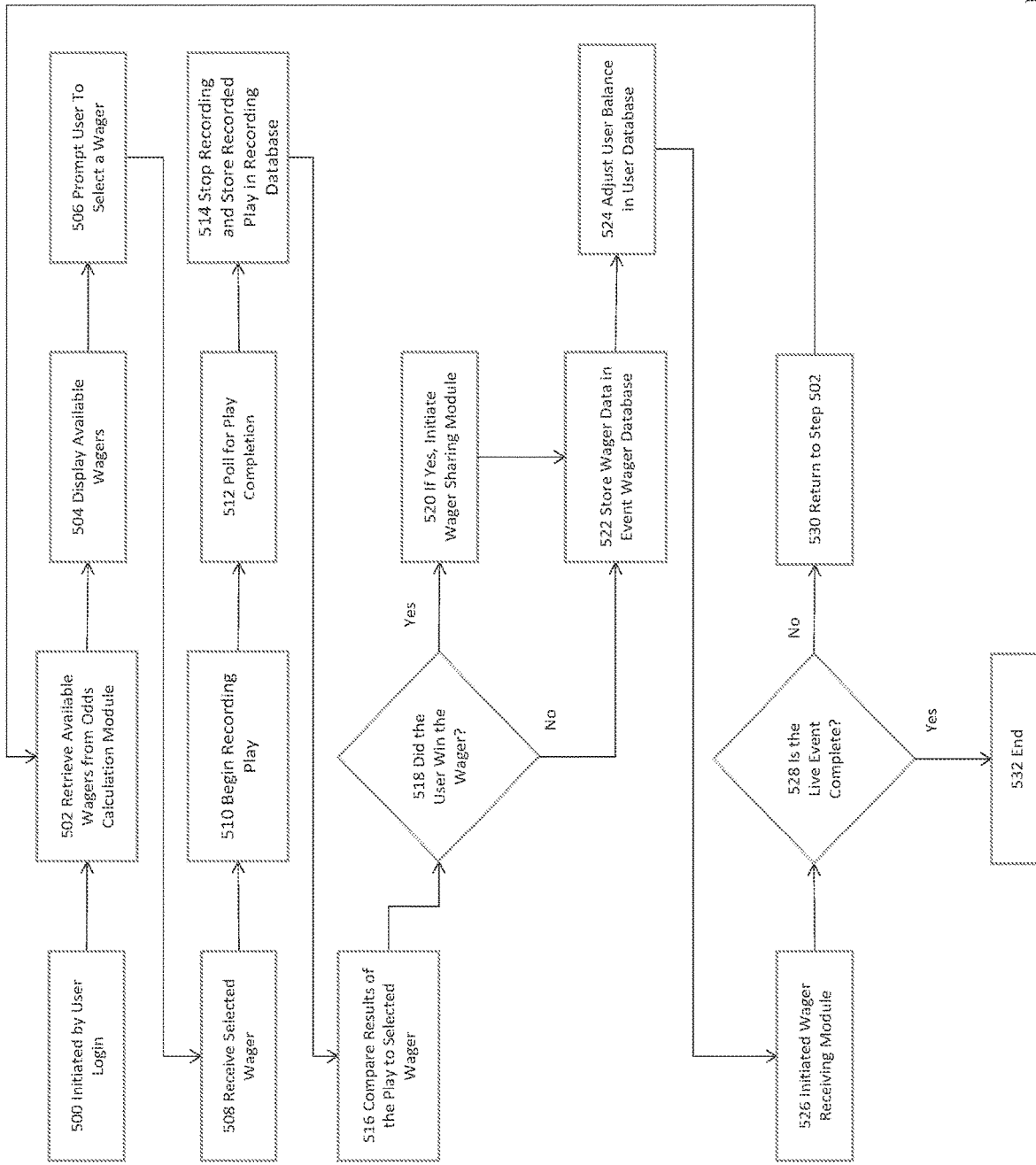
FIG. 5 illustrates a base wagering module, according to an embodiment.

FIG. 5 illustrates the base wagering module 122. The process begins with the base wagering module 122 being, at step 500, initiated by user login via the wagering app 128, for example user Bob is watching a baseball game on 8/11/2020 and logs into the wagering app 128 to make wagers, the login includes at least a user ID, in some embodiments the login may include security credentials such as a password. The base wagering module 122 retrieves, at step 502, the available wagers for the current play of the live event 102 from the odds calculation module 112, in an embodiment wagers and odds may be retrieved from a third party. The base wagering module 122 displays, at step 504, the available wagers for the current play and the associated odds for each wager. The base wagering module 122 prompts, at step 506, the user to select one of the available wagers, for example, user Bob can wager that the next play will be a strike or home run, in an embodiment this selection process may be facilitated by a GUI within the wagering app 130. The base wagering module 122 receives, at step 508, the user's selection of wager for the current play and the amount of money the user has wagered. The base wagering module 122 begins, at step 510, to record the play of the live game 102. The base wagering module 122 polls, at step 512, for completion of the current play of the live event 102. The base wagering module 122 stops, at step 514, recording the play and stores the created record in the recording database 120. The base wagering module 122 compares, at step 516, the actual results of the play of the live event 102 to the user's wager selection. The base wagering module 122 determines, at step 518, if the user won the wager based on the comparison of the results to the selected wager, if the user did not win the wager, the base wagering module 122 skips to step 522. If the user won the wager, the base wagering module 122 initiates, at step 520, the wager sharing module 124 and sends the wager information. The base wagering module 122 stores, at step 522, the user ID, wager selection, wager results, live game ID, and play ID, in the event wager database 118. The base wagering module 122 adjusts, at step 524, the user's balance in the user database 110 based on whether the wager was won or lost, in an embodiment a third party will instead handle user balance and payments. The base wagering module 122 initiates, at step 526, the wager receiving module 126. The base wagering module 122 determines, at step 528, if the live event 102 is complete via data from the sensor feeds 104, in some embodiments the end of the live event may be manually determined or determined by another module. If the live event 102 is not complete, the base wagering module 122 returns, at step 530, to step 502. If the live event 102 is complete, the base wagering module 122 ends, at step 532.

In further embodiments, it may be understood that the making or generating of a recording may not be performed and, instead, a video file which has already been created and may be stored in a database or otherwise linked, may be utilized in any of the embodiments. For example, a video file stored in another database may have utilize timestamps associated with a beginning and end of a play. Further, any polling or determining of a start and end portion of a play may be done without a new recording being generated, locally or otherwise.

Figure 6:
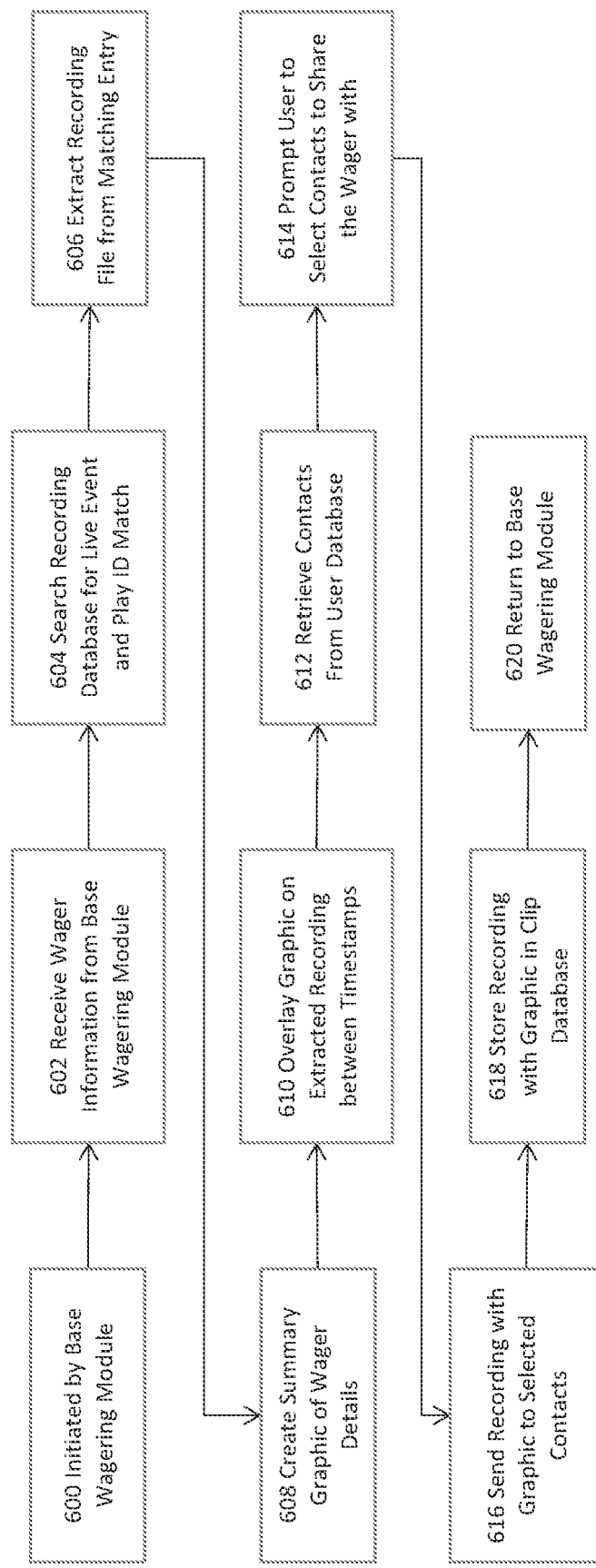
FIG. 6 illustrates a wager sharing module, according to an embodiment.

FIG. 6 illustrates the wager sharing module 124. The process begins with the wager sharing module 124 being, at step 600, initiated by the base wagering module 122. The wager sharing module 124 receives, at step 602, wager information from the base wagering module 122. The wager sharing module 124 searches, at step 604, for an entry in the recording database 120 that matches the received live event ID and play ID. The wager sharing module 124 extracts, at step 608, the recording file from the matching entry. The wager sharing module 124 creates, at step 610, a summary graphic using the received wager information, the data is inserted into a graphical template which creates a graphic for the wager, in some embodiments more than one graphical template may exist and the wager sharing module 124 may select one. The wager sharing module 124 overlays, at step 612, the created graphic onto the recording such that the viewer will see both the video and the graphic with the video behind the graphic. The wager sharing module 124 retrieves, at step 614, contacts for the user from the user database 110. The wager sharing module 124 prompts, at step 616, the user to select which contacts they want to share the wager and play with, for example user Bob can select from any of his contacts in the user database 110 like his son James Patterson who has the user Id "jpatterson", in some embodiments this selection may be facilitated by a GUI. The wager sharing module 124 sends, at step 618, the recording with the created graphical overlay to the selected contacts. The wager sharing module 124 returns, at step 620, to the base wagering module 122.

Figures 7, 8:
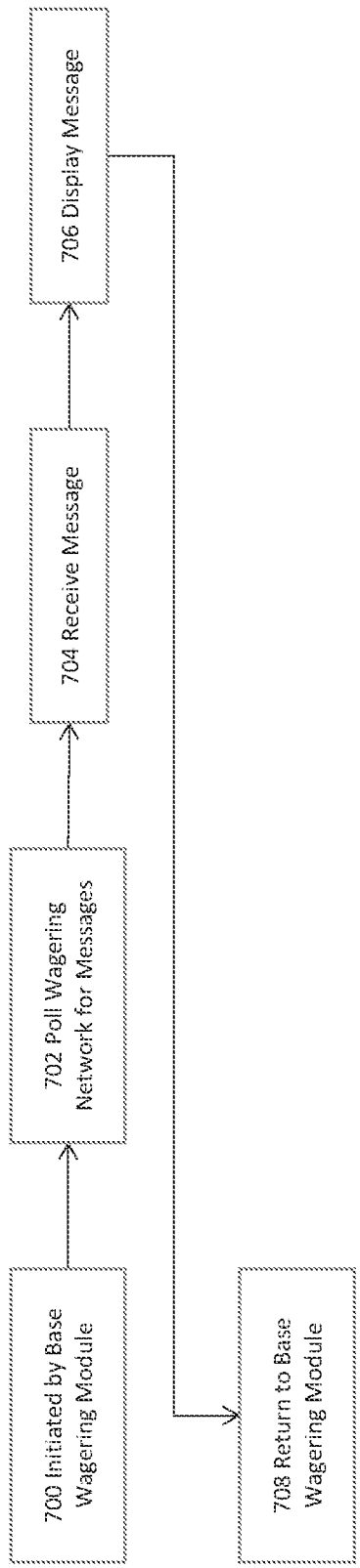
FIG. 7 illustrates a wager receiving module, according to an embodiment.
FIG. 8 illustrates a clip database, according to an embodiment.

FIG. 7 illustrates the wager receiving module 126. The process begins with the wager receiving module 126 being, at step 700, initiated by the base wagering module 122. The wager receiving module 126 polls, at step 702, for messages from the wagering network 108, for example, video files send by the wager sharing module 124. The wager receiving module 126 receives, at step 704, the message or messages from the wagering network 108, for example user Bob Patterson receives a message from his friend Joe Smith delivered via the wagering network 108. The wager receiving module 126 displays, at step 706, the received messages to the user via the user's wagering app 130, for example user Bob Patterson looks at his message from his friend Joe Smith, the message is a video file of a play from the baseball game both Bob and Joe are watching, Bob sees the recording of the play with information about Joe's wager overlayed. The wager receiving module 126 returns, at step 708, to the base wagering module 122.

FIG. 8 illustrates the clip database 128. The clip database 128 stores the recordings of individual plays with the wagering information overlayed and includes a user ID, for example "bpatterson", a video file or clip, for example, "1.MP4", the selected wager option, for example, run, whether the wager was won or lost, a live event ID, for example, "08112020", a play ID, for example, "12". In an embodiment the user can name the clip before is stored in the clip database 128 by the wager sharing module 124.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of sharing a wager placed inside of a live sporting event and video of the live sporting event on a wagering network, comprising:
receiving data from the live sporting event upon which wagers can be placed;
recording video of the live sporting event, wherein the wagering network is configured to perform real time analysis on a type of the action and a result of the action;
associating at least one timestamp with a start time and at least one timestamp with an end time of at least one action in the recorded video of the live sporting event on which wager can be placed to create a play ID; and
initiating a sharing module of the wagering network upon a determination that results of a wager are known, wherein the sharing module is configured to:
receive information about the wager,
search for the recorded video in a recording database by matching a live event ID and at least one play ID,
extract the recorded video from the recording database,
create a graphic about the wager,
overlay the created graphic onto the recorded video to create a sendable file,
retrieve one or more contacts from a contact database, and
send the sendable file with the overlayed graphic to one or more contacts selected by the at least one user.

2. The method of claim 1, wherein the recorded video comprises more than one play.

3. The method of claim 1, further comprising:
automatically sharing the recorded video upon which the at least one user has placed a wager upon a determination that the wager was successful.

4. The method of claim 1, wherein the sendable file is a clip.

5. The method of claim 1, wherein the sendable file is a video.

6. The method of claim 1, wherein, after the created graphic is overlayed onto the recorded video, the recorded video is visible behind the overlayed graphic.

7. The method of claim 1, wherein creating the graphic about the wager involves use of a graphical template.

8. The method of claim 7, further comprising:
inserting the data into the graphical template.

9. The method of claim 7, wherein a plurality of graphical templates exists.

10. The method of claim 9, further comprising:
selecting a particular graphical template from the plurality of graphical templates.

* * * * *